US010846593B2

(12) United States Patent
Sanchez et al.

(10) Patent No.: US 10,846,593 B2
(45) Date of Patent: Nov. 24, 2020

(54) SYSTEM AND METHOD FOR SIAMESE INSTANCE SEARCH TRACKER WITH A RECURRENT NEURAL NETWORK

(71) Applicant: QUALCOMM TECHNOLOGIES, Inc., San Diego, CA (US)

(72) Inventors: Yoel Sanchez, Diemen (NL); Efstratios Gavves, Amsterdam (NL); Ran Tao, Amsterdam (NL)

(73) Assignee: Qualcomm Technologies Inc., San Diego, CA (US)

( * ) Notice: Subject to any disclaimer, the term of this patent is extended or adjusted under 35 U.S.C. 154(b) by 0 days.

(21) Appl. No.: 16/389,897

(22) Filed: Apr. 19, 2019

(65) Prior Publication Data

US 2019/0332935 A1    Oct. 31, 2019

Related U.S. Application Data

(60) Provisional application No. 62/664,069, filed on Apr. 27, 2018.

(51) Int. Cl.
| | | |
|---|---|---|
| *G06N 3/08* | (2006.01) | |
| *G06N 20/10* | (2019.01) | |
| *G06T 7/70* | (2017.01) | |
| *G06T 7/20* | (2017.01) | |

(52) U.S. Cl.
CPC ............... *G06N 3/08* (2013.01); *G06N 20/10* (2019.01); *G06T 7/20* (2013.01); *G06T 7/70* (2017.01);

(Continued)

(58) Field of Classification Search
CPC .......... G06N 3/08; G06N 3/0454; G06N 3/04; G06N 3/049; G06N 3/00; G06N 3/0445;
(Continued)

(56) References Cited

U.S. PATENT DOCUMENTS 10,019,631 B2 * 7/2018 Tao ..................... G06T 7/246
10,504,010 B2 * 12/2019 Mao .................... G06N 3/0454
(Continued)

OTHER PUBLICATIONS

"Siamese recurrent architecture for visual tracking"; Xiaqing Xu; 2017 IEEE International Conference on Image Processing (ICIP); Sep. 17-20, 2017 (Year: 2017).*

*Primary Examiner* — Michael S Osinski
(74) *Attorney, Agent, or Firm* — Arent Fox, LLP

(57) ABSTRACT

An apparatus may be configured to obtain, for a Siamese neural network having a recurrent neural network (RNN), an initial representation associated with a target object at a first time step and a set of candidate regions at a current time step. The apparatus may determine an updated representation associated with the target object based on the initial representation at the first time step and observed information associated with the target object at a set of previous time steps, and the observed information associated with the target object may be represented by a hidden state of the RNN. The apparatus may output the updated representation associated with the target object for matching with the set of candidate regions at the current time step by the Siamese neural network. The apparatus may determine the updated representation further based on a hidden state at a previous time step.

24 Claims, 9 Drawing Sheets

(52) U.S. Cl.
CPC ............... *G06T 2207/20081* (2013.01); *G06T 2207/20084* (2013.01)

(58) Field of Classification Search
CPC .......... G06N 3/063; G06N 20/10; G06T 7/70; G06T 7/20; G06T 7/246; G06T 7/248; G06T 2207/20081–20084; G06T 2207/20016–20021; G06K 9/4628; G06K 9/6256; G06K 9/00758; G06K 9/00791; G06K 9/3241; G06K 9/6262; G06K 9/6234; G06K 2009/3291; G06K 2209/21
See application file for complete search history.

(56) References Cited

U.S. PATENT DOCUMENTS

| | | | |
|---|---|---|---|
| 2015/0170028 A1* | 6/2015 | Gupta | G06N 3/08 706/20 |
| 2015/0286925 A1* | 10/2015 | Levin | G06N 3/049 706/25 |
| 2016/0239706 A1* | 8/2016 | Dijkman | G06K 9/66 |
| 2017/0132472 A1* | 5/2017 | Tao | G06N 3/08 |
| 2018/0060684 A1* | 3/2018 | Ma | G06K 9/6215 |
| 2018/0181822 A1* | 6/2018 | Chang | G06K 9/628 |
| 2018/0349758 A1* | 12/2018 | Pan | G06N 3/0454 |
| 2019/0080456 A1* | 3/2019 | Song | G06T 7/12 |
| 2019/0221121 A1* | 7/2019 | Guo | G06K 9/00798 |
| 2019/0236782 A1* | 8/2019 | Amit | A61B 10/0041 |
| 2019/0311202 A1* | 10/2019 | Lee | G06K 9/6256 |
| 2019/0311259 A1* | 10/2019 | Cricri | H04L 65/605 |
| 2020/0005051 A1* | 1/2020 | Chen | G06K 9/4628 |
| 2020/0126192 A1* | 4/2020 | Munkberg | G06N 3/08 |
| 2020/0151506 A1* | 5/2020 | Li | G06K 9/00684 |
| 2020/0193656 A1* | 6/2020 | Schoendube | G06T 11/008 |
| 2020/0210708 A1* | 7/2020 | Jia | G06K 9/00718 |
| 2020/0218888 A1* | 7/2020 | Gong | G06N 5/04 |
| 2020/0219467 A1* | 7/2020 | Okamoto | G09G 5/37 |

* cited by examiner

SYSTEM AND METHOD FOR SIAMESE INSTANCE SEARCH TRACKER WITH A RECURRENT NEURAL NETWORK

CROSS-REFERENCE TO RELATED APPLICATION(S)

This application claims priority of U.S. Provisional Patent Application No. 62/664,069, entitled "SYSTEM AND METHOD FOR SIAMESE INSTANCE SEARCH TRACKER WITH A RECURRENT NEURAL NETWORK" and filed on Apr. 27, 2018, which is expressly incorporated by reference herein in its entirety.

BACKGROUND

Field

Certain aspects of the present disclosure generally relate to machine learning and, more particularly, to improving systems and methods of object tracking using a Siamese neural network.

Background

An artificial neural network, which may include an interconnected group of artificial neurons (e.g., neuron models), is a computational device or represents a method to be performed by a computational device.

Convolutional neural networks are a type of feed-forward artificial neural network. Convolutional neural networks may include collections of neurons that each has a receptive field and that collectively tile an input space. Convolutional neural networks (CNNs) have numerous applications. In particular, CNNs have broadly been used in the area of pattern recognition and classification.

Deep learning architectures, such as deep belief networks and deep convolutional networks, are layered neural networks architectures in which the output of a first layer of neurons becomes an input to a second layer of neurons, the output of a second layer of neurons becomes and input to a third layer of neurons, and so on. Deep neural networks (DNNs) may be trained to recognize a hierarchy of features and so they have increasingly been used in object recognition applications. Like convolutional neural networks, computation in these deep learning architectures may be distributed over a population of processing nodes, which may be configured in one or more computational chains. These multi-layered architectures may be trained one layer at a time and may be fine-tuned using back propagation.

Other models are also available for object recognition. For example, support vector machines (SVMs) are learning tools that can be applied for classification. Support vector machines include a separating hyperplane (e.g., decision boundary) that categorizes data. The hyperplane is defined by supervised learning. A desired hyperplane increases the margin of the training data. In other words, the hyperplane should have the greatest minimum distance to the training examples.

Although these solutions achieve excellent results on a number of classification benchmarks, their computational complexity can be prohibitively high. Additionally, training of the models may be challenging.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

Visual object tracking is the task of estimating the location of a target object over a video given an image of the object at the start. Tracking is a fundamental research problem of computer vision. Tracking has numerous follow-on applications in surveillance, robotics and human computer interaction, or all applications where the object location is important over time.

Algorithms for visual object tracking may fall into two families of approaches. One family includes the visual object trackers that discriminate the target from the background. The discrimination may be learned on the fly from the previous frame/frames. The prevalent computational method for the family of discriminative trackers may be based on the discriminative correlation filter (DCF). Discriminative trackers may update their functions in each frame, relying on the target appearance from the target location predicted in the previous frame. The target appearance might change due to a variety of reasons that relate to environmental and not object-related factors, such as occlusion or specularities. As such, the updating of a discriminative tracker function may learn accidental artifacts that will derail the tracker soon after. Thus, discriminative trackers may not function well if false updates degrade the internal model of the trackers.

An alternative family of visual object trackers is generative trackers, which search in the current frame for the candidate most similarity to the start image of the target. The oldest of the generative trackers is the NCC tracker, where the similarity function measures the similarity of the intensity values of two image patches. In generative trackers, a complex but generic similarity function may be learned off-line by specialized deep Siamese networks. The deep Siamese networks may be trained to properly measure similarity for any object submitted for tracking. A generative tracker using a Siamese network may be referred to as a Siamese tracker. The online tracking strategy of a Siamese tracker may be simple—just finding a local maximum of the run-time-fixed similarity function. Siamese trackers may show comparable results to DCF trackers on tracking benchmarks. The deep Siamese neural networks in these trackers may be able to learn all typical appearance variations of an object. Hence, the Siamese trackers may no longer require online updating during the tracking, which may reduce the likelihood of the internal model of the trackers getting corrupted.

In an aspect of the disclosure, a method, a computer-readable medium, and apparatus for operating a computational network are provided. The apparatus may be configured to obtain, for a Siamese neural network having a recurrent neural network (RNN), an initial representation associated with a target object at a first time step and a set of candidate regions at a current time step. The apparatus may determine an updated representation associated with the target object based on the initial representation at the first time step and observed information associated with the target object at a set of previous time steps, and the observed information associated with the target object may be represented by a hidden state of the RNN. The apparatus may output the updated representation associated with the target object for matching with the set of candidate regions at the current time step by the Siamese neural network. The apparatus may determine the updated representation further based on a hidden state at a previous time step. In one aspect, the apparatus may linearly transform the hidden state, and add the linearly transformed hidden state to the initial representation. In one aspect, the apparatus may compute a next cell state and a next hidden state for determination of another updated representation associated with the target object at a subsequent time step. In one aspect, the computation of the next cell state and the next hidden state may be based on a candidate region at the current time step that is determined to best match the updated representation by the Siamese neural network and may be further based on the cell state and the hidden state at the previous time step. In one aspect, the RNN may include a single-layer long-short term memory (LSTM) network.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Figure 1:
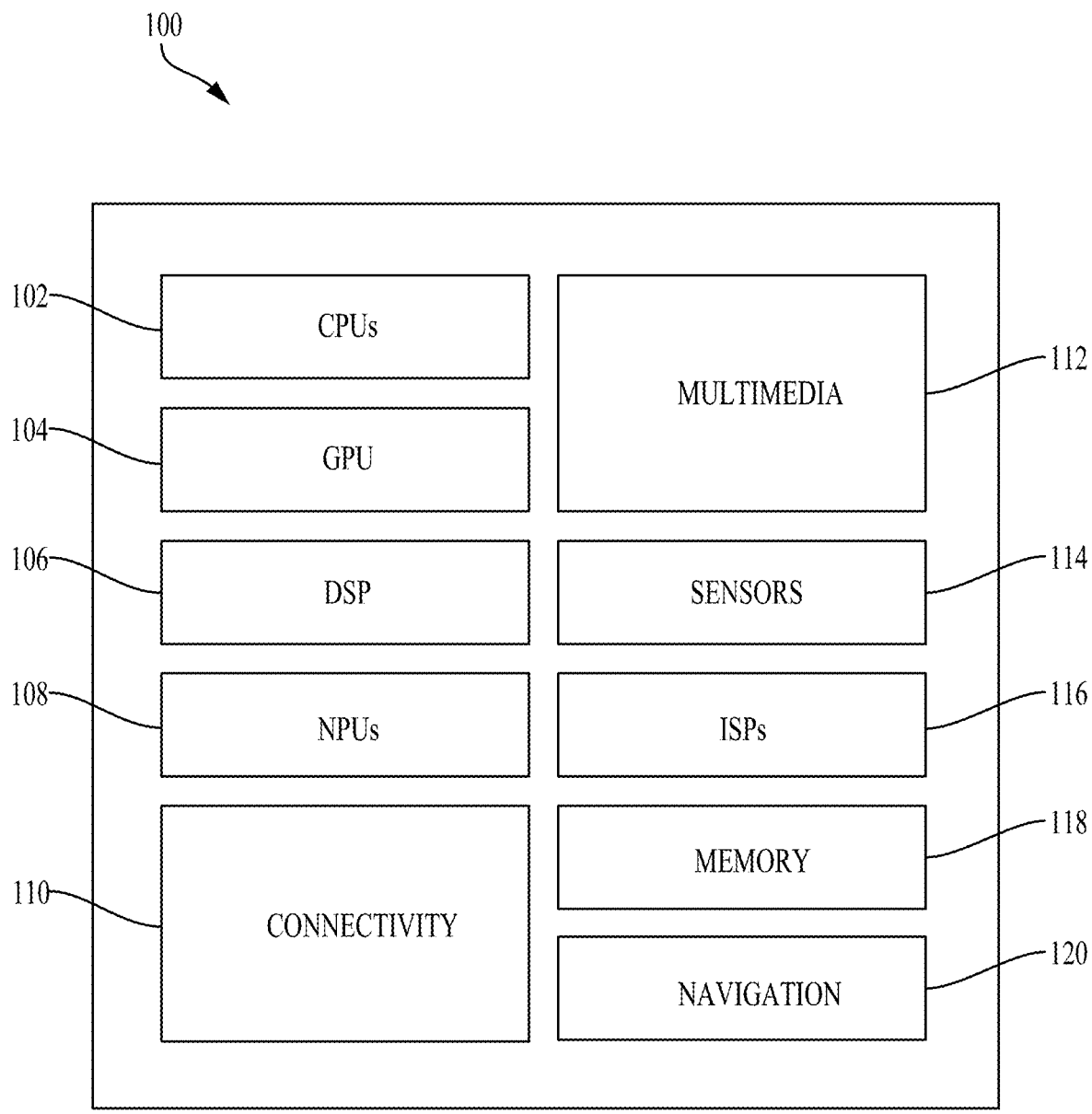
FIG. 1 illustrates an example implementation of designing a neural network using a system-on-a-chip (SOC), including a general-purpose processor in accordance with certain aspects of the present disclosure.

FIG. 1 illustrates an example implementation of a Siamese neural network that is communicatively coupled with a recurrent neural network (RNN) using a system-on-a-chip (SOC) 100, which may include a general-purpose processor (CPU) or multi-core general-purpose processors (CPUs) 102 in accordance with certain aspects of the present disclosure. Variables (e.g., neural signals and synaptic weights), system parameters associated with a computational device (e.g., neural network with weights), delays, frequency bin information, and task information may be stored in a memory block associated with a Neural Processing Unit (NPU) 108, in a memory block associated with a CPU 102, in a memory block associated with a graphics processing unit (GPU) 104, in a memory block associated with a digital signal processor (DSP) 106, in a dedicated memory block 118, or may be distributed across multiple blocks. Instructions executed at the general-purpose processor 102 may be loaded from a program memory associated with the CPU 102 or may be loaded from a dedicated memory block 118.

The SOC 100 may also include additional processing blocks tailored to specific functions, such as a GPU 104, a DSP 106, a connectivity block 110, which may include fourth generation long term evolution (4G LTE) connectivity, 5G New Radio (NR) connectivity, Wi-Fi and/or other wireless local area network connectivity, USB connectivity, Bluetooth and/or Bluetooth Low Energy connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs), and/or navigation 120, which may include a global positioning system.

The SOC 100 may be based on an ARM instruction set. In an aspect of the present disclosure, the instructions loaded into the general-purpose processor 102 may include code to obtain, for a Siamese neural network having an RNN, an initial representation associated with a target object at a first time step and a set of candidate regions at a current time step. The instructions may include code to determine an updated representation associated with the target object based on the initial representation at the first time step and observed information associated with the target object at a set of previous time steps, and the observed information associated with the target object may be represented by a hidden state of the RNN. The instructions may include code to output the updated representation associated with the target object for matching with the set of candidate regions at the current time step by the Siamese neural network. The determination of the updated representation may be further based on a hidden state at a previous time step. In one aspect, the instructions may include code to linearly transform the hidden state, and add the linearly transformed hidden state to the initial representation. In one aspect, the instructions may include code to compute a next cell state and a next hidden state for determination of another updated representation associated with the target object at a subsequent time step. In one aspect, the computation of the next cell state and the next hidden state may be based on a candidate region at the current time step that is determined to best match the updated representation by the Siamese neural network and may be further based on the cell state and the hidden state at the previous time step. In one aspect, the RNN may include a single-layer long-short term memory (LSTM) network.

Figure 2:
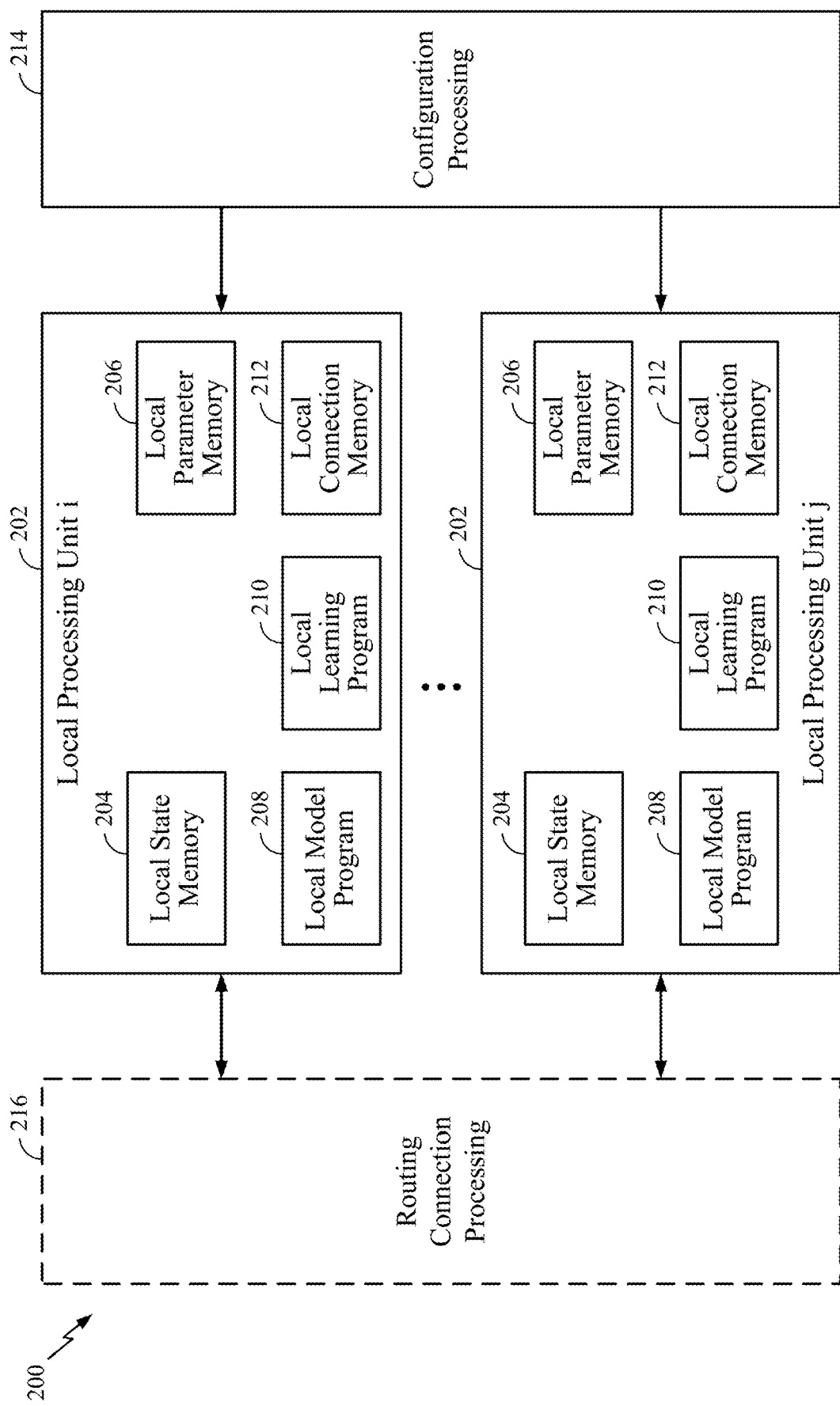
FIG. 2 illustrates an example implementation of a system in accordance with aspects of the present disclosure.

FIG. 2 illustrates an example implementation of a system 200 in accordance with certain aspects of the present disclosure. As illustrated in FIG. 2, the system 200 may have multiple local processing units 202 that may perform various operations of methods described herein. Each local processing unit 202 may include a local state memory 204 and a local parameter memory 206 that may store parameters of a neural network. In addition, the local processing unit 202 may have a local (neuron) model program (LMP) memory 208 for storing a local model program, a local learning program (LLP) memory 210 for storing a local learning program, and a local connection memory 212. Furthermore, as illustrated in FIG. 2, each local processing unit 202 may interface with a configuration processor unit 214 for providing configurations for local memories of the local processing unit, and with a routing connection processing unit 216 that provides routing between the local processing units 202.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 3A:
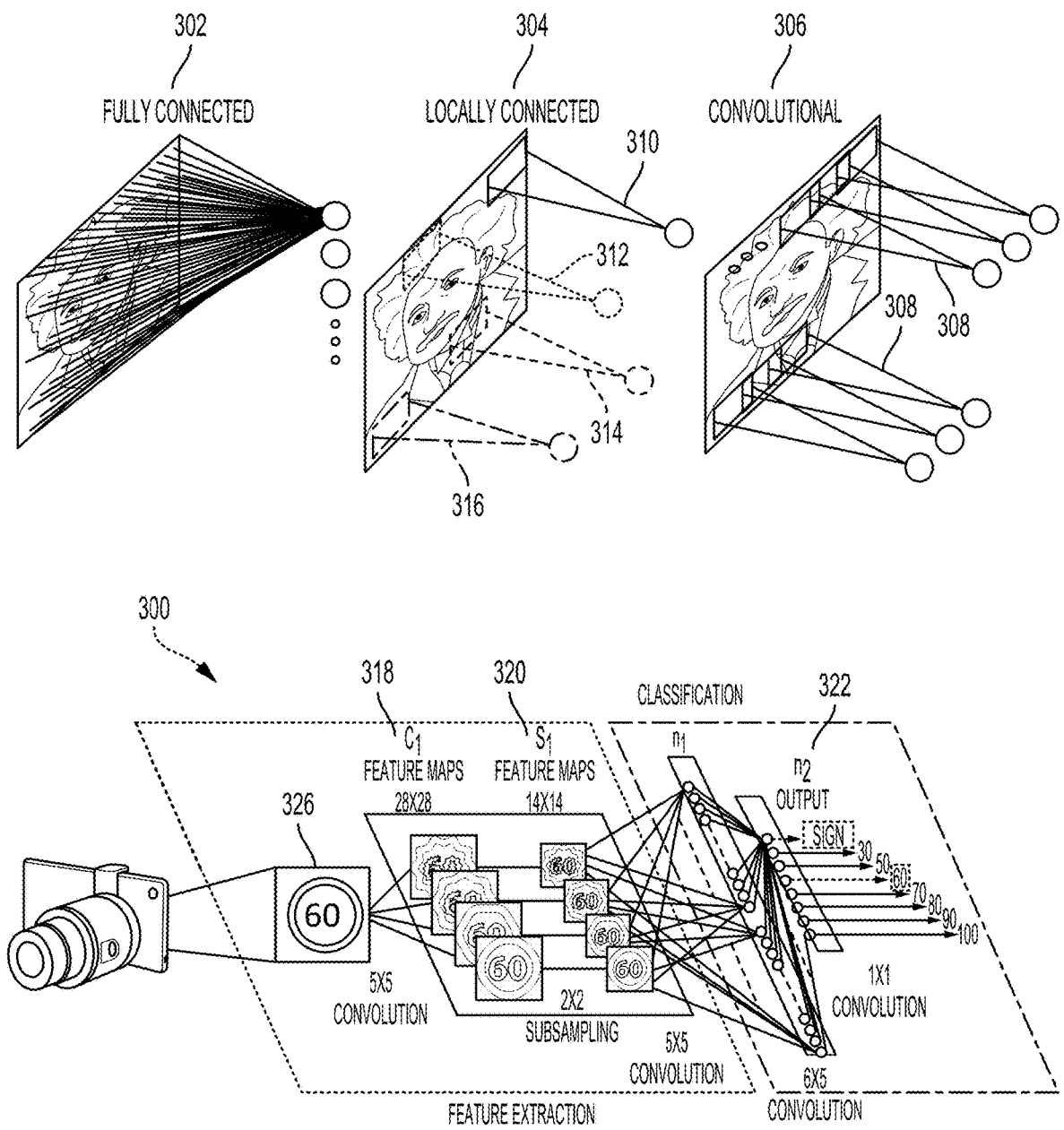
FIG. 3A is a diagram illustrating a neural network in accordance with aspects of the present disclosure.

Referring to FIG. 3A, the connections between layers of a neural network may be fully connected 302 or locally connected 304. In a fully connected network 302, a neuron in a first layer may communicate its output to every neuron in a second layer, so that each neuron in the second layer will receive input from every neuron in the first layer. Alternatively, in a locally connected network 304, a neuron in a first layer may be connected to a limited number of neurons in the second layer. A convolutional network 306 may be locally connected, and is further configured such that the connection strengths associated with the inputs for each neuron in the second layer are shared (e.g., 308). More generally, a locally connected layer of a network may be configured so that each neuron in a layer will have the same or a similar connectivity pattern, but with connections strengths that may have different values (e.g., 310, 312, 314, and 316). The locally connected connectivity pattern may give rise to spatially distinct receptive fields in a higher layer, because the higher layer neurons in a given region may receive inputs that are tuned through training to the properties of a restricted portion of the total input to the network.

Locally connected neural networks may be well suited to problems in which the spatial location of inputs is meaningful. For instance, a network 300 designed to recognize visual features from a car-mounted camera may develop high layer neurons with different properties depending on their association with the lower versus the upper portion of the image. Neurons associated with the lower portion of the image may learn to recognize lane markings, for example, while neurons associated with the upper portion of the image may learn to recognize traffic lights, traffic signs, and the like.

A deep convolutional network (DCN) may be a network of convolutional network(s), configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that includes recurrent or feedback connections.

A DCN may be trained with supervised learning. During training, a DCN may be presented with an image, such as a cropped image of an image 326, such as a speed limit sign. The DCN may then compute a "forward pass" to produce an output 322. The output 322 may be a vector of values corresponding to features such as "sign," "60," and "100." The network designer may want the DCN to output a high score for some of the neurons in the output feature vector, for example the ones corresponding to "sign" and "60" as shown in the output 322 for a network 300 that has been trained. Before training, the output produced by the DCN is likely to be incorrect, and so an error may be calculated between the actual output and the target output. The weights of the DCN may then be adjusted so that the output scores of the DCN are more closely aligned with the target.

To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After learning, the DCN may be presented with an image 326, which may be a new image. A forward pass through the network may yield an output 322 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer 318 and 320, with each element of the feature map (e.g., 320) receiving input from a range of neurons in the previous layer (e.g., 318) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks (DNNs) are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3B:
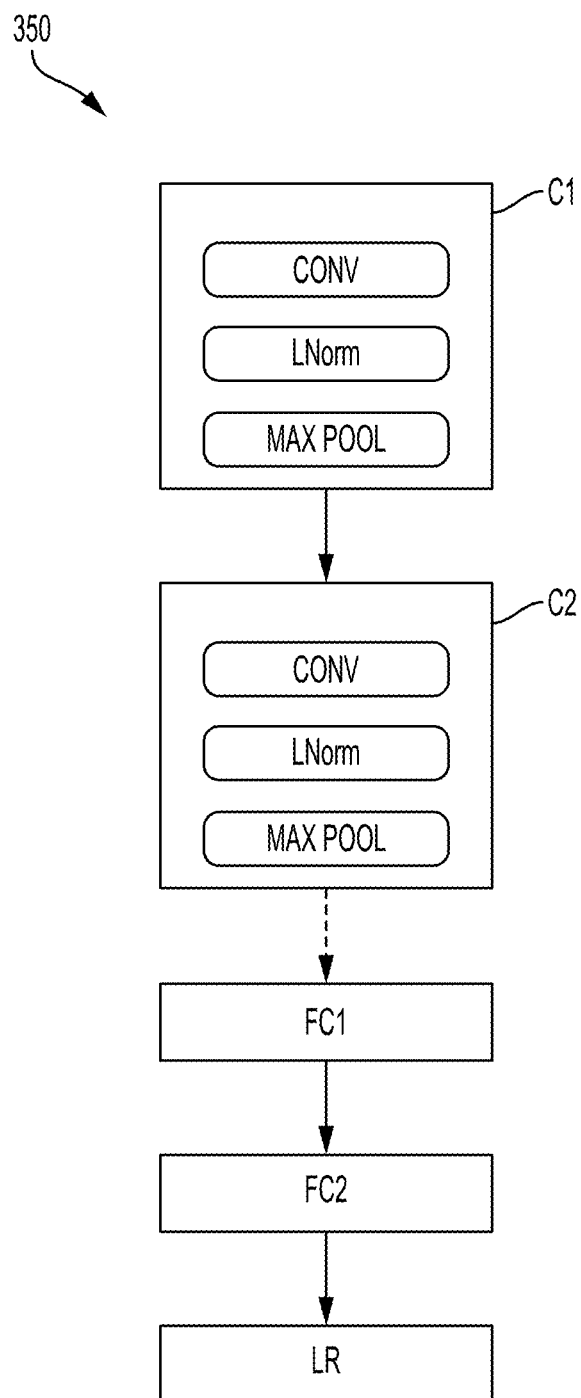
FIG. 3B is a block diagram illustrating an exemplary deep convolutional network (DCN) in accordance with aspects of the present disclosure.

FIG. 3B is a block diagram illustrating an exemplary deep convolutional network 350. The deep convolutional network 350 may include multiple different types of layers based on connectivity and weight sharing. As shown in FIG. 3B, the exemplary deep convolutional network 350 includes multiple convolution blocks (e.g., C1 and C2). Each of the convolution blocks may be configured with a convolution layer, a normalization layer (LNorm), and a pooling layer. The convolution layers may include one or more convolutional filters, which may be applied to the input data to generate a feature map. Although only two convolution blocks are shown, the present disclosure is not so limiting, and instead, any number of convolutional blocks may be included in the deep convolutional network 350 according to design preference. The normalization layer may be used to normalize the output of the convolution filters. For example, the normalization layer may provide whitening or lateral inhibition. The pooling layer may provide down sampling aggregation over space for local invariance and dimensionality reduction.

The parallel filter banks, for example, of a deep convolutional network may be loaded on a CPU 102 or GPU 104 of an SOC 100, optionally based on an ARM instruction set, to achieve high performance and low power consumption. In alternative embodiments, the parallel filter banks may be loaded on the DSP 106 or an ISP 116 of an SOC 100. In addition, the DCN may access other processing blocks that may be present on the SOC, such as processing blocks dedicated to sensors 114 and navigation 120.

The deep convolutional network 350 may also include one or more fully connected layers (e.g., FC1 and FC2). The deep convolutional network 350 may further include a logistic regression (LR) layer. Between each layer of the deep convolutional network 350 are weights (not shown) that are to be updated. The output of each layer may serve as an input of a succeeding layer in the deep convolutional network 350 to learn hierarchical feature representations from input data (e.g., images, audio, video, sensor data and/or other input data) supplied at the first convolution block C1.

In certain aspects, the SOC 100, the system 200, the network 300, or the deep convolutional network 350 may be configured to track visual objects, as will be described below with reference to FIGS. 4-8.

Object tracking may include the process of identifying (e.g., estimating) the location of an arbitrary object over a sequence of frames. Object tracking be employed in a variety of a situations, including surveillance and security, vehicle navigation, traffic monitoring, medical imaging, human-computer interaction, and so forth.

A Siamese neural network is a class of neural networks that contain two or more identical subnetworks. The two or more subnetworks are identical because the subnetworks may have the same configuration with the same parameters and weights. Parameter updating may be mirrored across all subnetworks. Siamese neural networks may be applied to tasks that involve finding similarity or a relationship between two comparable things. For example, a Siamese neural network may be used in visual object tracking. The input to a first subnetwork of the Siamese neural network may be an image of an object in the first/starting frame of a video, and the input to a second subnetwork of the Siamese neural network may be an image sampled from a subsequent frame of the video. The output of the Siamese neural network may indicate how similar the two inputs are. If the two inputs of the Siamese neural network are similar to a certain degree, the location of the target object in the subsequent frame may be identified.

Figure 4:
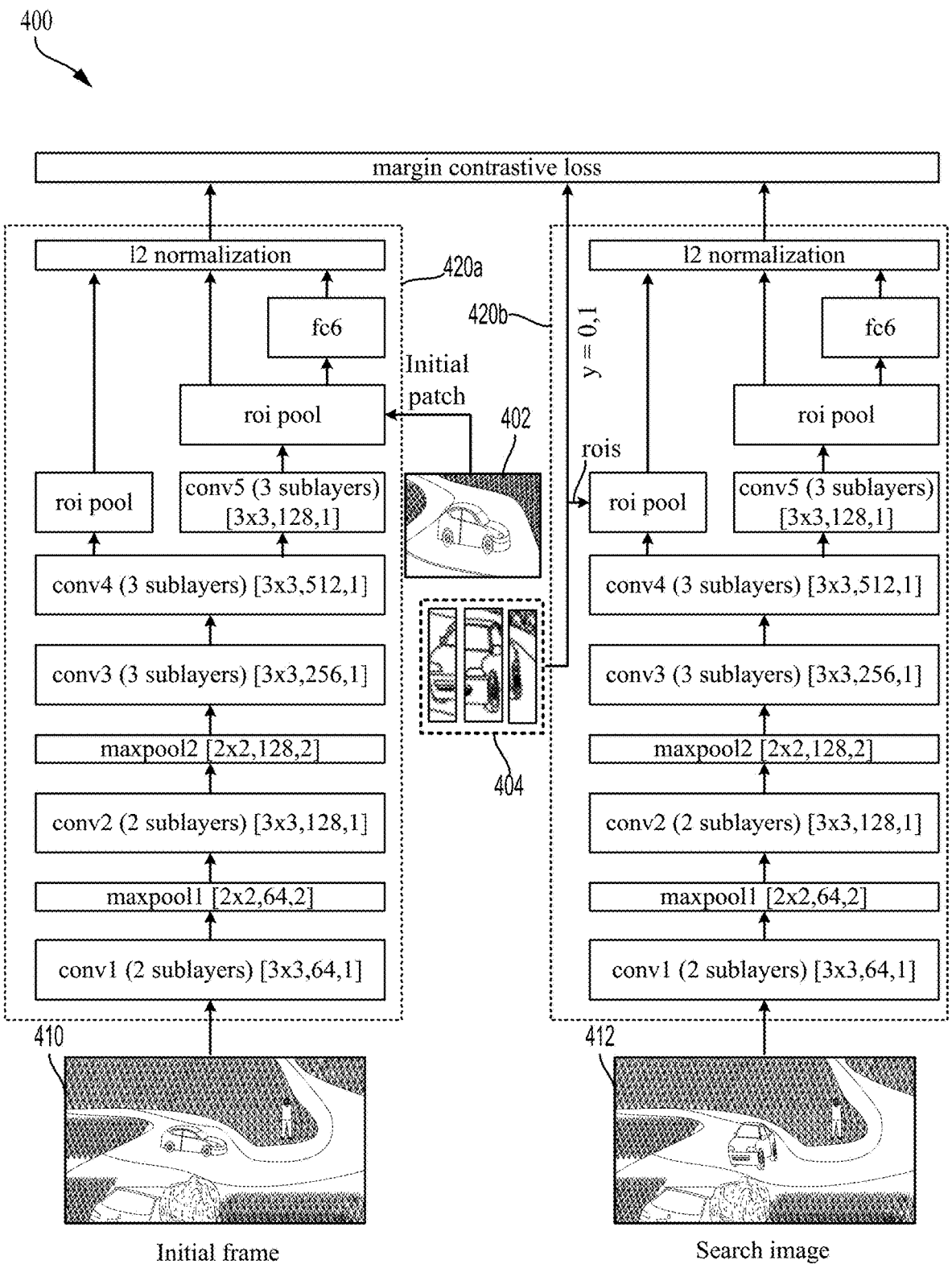
FIG. 4 is a diagram of a Siamese INstance Tracker in accordance with aspects of the present disclosure.

FIG. 4 is a block diagram of object tracking 400 in accordance with aspects of the present disclosure. FIG. 4 may illustrate a Siamese INstance Tracker (SINT), which may include a Siamese neural network. As illustrated, the Siamese neural network may be of a two-stream architecture that may work well with data pairs. Thus, the Siamese neural network may be composed of two branches 420a-b that separately process distinct inputs. However, each of the branches 420a-b may be similar, in that each branch 420a-b may share a common set of parameters (e.g., weights) and/or configurations.

In some aspects, a first branch 420a may obtain a first frame 410. The first frame 410 may include a target that is to be identified in a subsequent frame 412. The first branch 420a may determine a feature representation 402 that represents the target to be identified in the subsequent frame 412.

The second branch 420b may obtain a subsequent frame. The subsequent frame 412 may include the target, but the location of the target may be unidentified. The second branch 420b may determine a set of feature representations 404 that represent estimated locations of the target in the subsequent frame 412.

As illustrated, each branch 420a-b of the SINT may include a plurality of convolutional layers (conv1, conv2, . . . , conv5), maxpool layers, and region of interest (roi) pooling layers (roi pool), as well as a respective $l^2$ normalization (l2 normalization) and a respective fully connected (fc) layer (fc6). Each convolutional layer may compute an output of neurons that are connected to local regions in the input (e.g., the first frame 410 for the first branch 420a, the subsequent frame 412 for the second branch 420b). For each convolutional layer, the kernel size may be 3×3 and the stride may be 1. The output size may vary for different convolutional layers—e.g., the output size of conv1 may be 64, the output size of conv2 may be 128, etc.

The first two convolutional layers (e.g., conv1 and conv2) may input into a respective maxpool layer (e.g., maxpool1 and maxpool2). The maxpool layers may reduce the spatial dimension of the input volume for the following layers. For each maxpool layer, the kernel size may be 2×2 and the stride may be 2. The output size may be different for each maxpool layer—e.g., the output size of maxpool1 may be 64 and the output size of maxpool2 may be 128.

The fourth convolutional layer conv4 may input to one roi pooling layer and a fifth convolutional layer conv5 and, further, the fifth convolutional layer conv5 may input to another roi pooling layer. The roi pooling layers may receive, as inputs, the regions of interest and a sets of coordinates for regions of interest, and may extract a list of corresponding feature maps with a fixed, predefined size (e.g., 7×7). For example, the first branch 420a may receive a region (e.g., initial patch) that corresponds to the target feature representation 402, and the second branch 420b may receive regions that correspond to the candidate feature representations 404.

The roi pooling layers may input to the $l^2$ normalization layer and the fc layer, and the fc layer may further input to the $l^2$ normalization layer. The fc layer may compute class scores. The $l^2$ normalization may be the Euclidean norm of input vectors, which may mitigate the influence of the scale of features generated by the roi pooling layers and the fc layer.

The two branches 420a-b may be joined at the top by an energy function. The energy function may compute similarity metrics between a target feature representation 402 and candidate feature representations 404. For example, for input data pairs corresponding to the target feature representation 402 and the candidate feature representations 404, each branch 420*a-b* may generate feature representations that may be relatively close for positive pairs but relatively far apart by some margin for negative pairs. Thus, the SINT may employ a margin contrastive loss layer, which may be optimized in order for the energy function to compute the similarity metrics. Based on the computed similarity metrics, the best candidate feature representation of the representations 404 may be identified as the location of the object in the subsequent frame 412.

Figure 5:
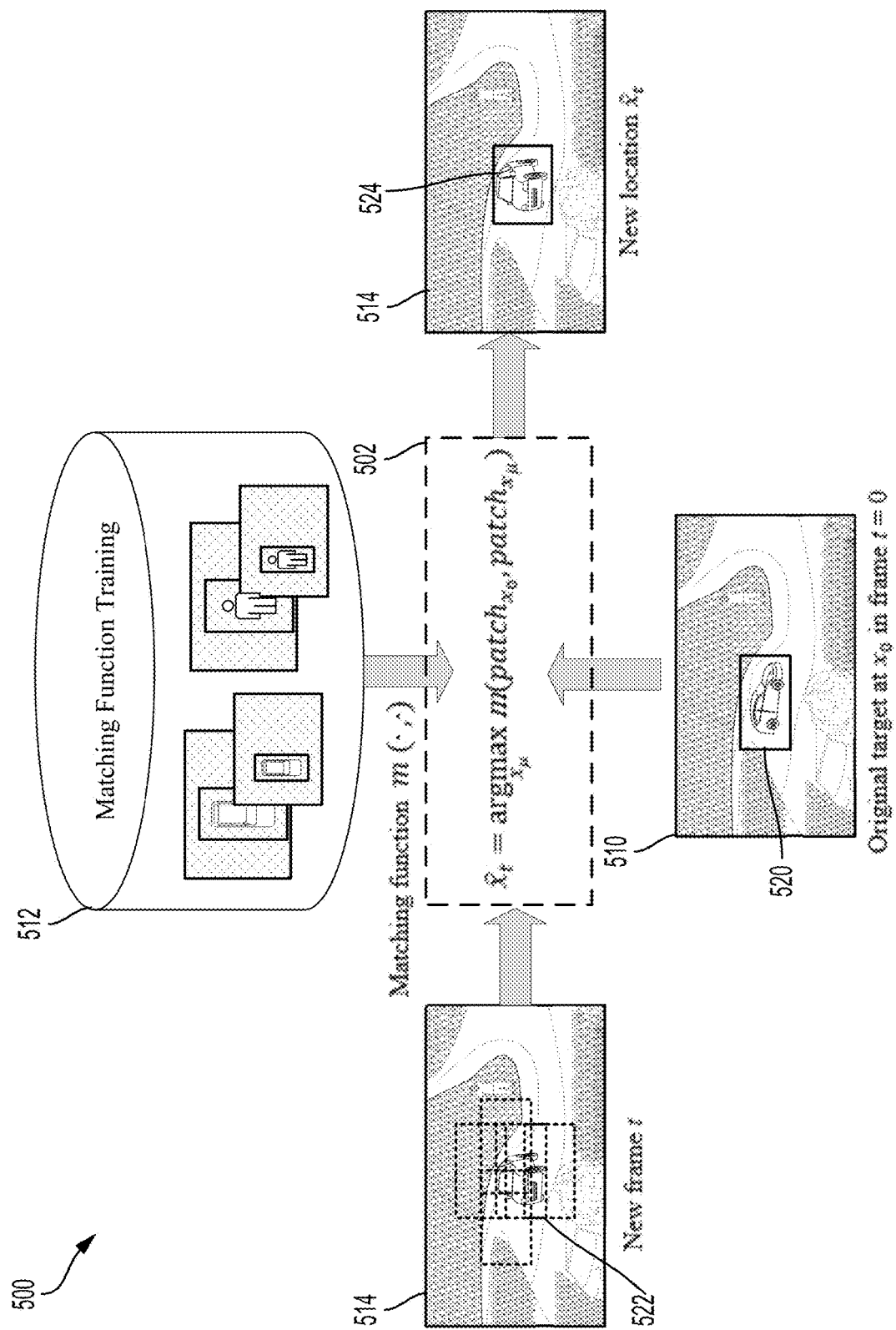
FIG. 5 is a diagram of a Siamese INstance Tracker in accordance with aspects of the present disclosure.

FIG. 5 is a diagram 500 of an example of object tracking using a SINT. The SINT may use a Siamese neural network to learn a matching function 502 that is used to find the candidate region 524 (e.g., bounding box) that best matches the target in the location 520 in the first frame 510. The matching function 502 may be derived through training 512 on sets of examples.

In this example, a vehicle may be first identified at a location 520 in the starting or first frame 510 of the video. According to some aspects, the location 520 of the vehicle may be a bounding box defined by a set of coordinates (e.g., an "x" coordinate, a "y" coordinate, a height, and a width).

In the subsequent frames of the video, the location of the vehicle may be tracked based on the initial image of the vehicle identified at location 520. For example, the estimated vehicle location in a subsequent frame 514 may be identified in one or more candidate regions 522.

Changes to the representation of the vehicle in the subsequent frame 514 (and other subsequent frames) may introduce issues or difficulties in object tracking using a Siamese neural network. For example, in the subsequent frame 514, the vehicle may be rotated, such as when the vehicle turns. Other examples of such changes or difficulties in identifying a target object (e.g., the vehicle) may include occlusion, deformation, scale change, in-plane rotation and complex motion, out-of-plane rotation, background clutter, confusion (e.g., confusion with other similar objects represented in the frame 514), illumination variation, and so forth.

Through training 512, the matching function 502 may learn to identify locations of objects in subsequent frames even when the object has undergone changes between the first frame and subsequent frames (e.g., occlusion, rotation, distortion, etc.). When tracking an object, the trained matching function 502 may be applied between the location 520 and the candidate regions 522.

In some cases, the trained matching function 502 may identify a "best" candidate region 524, which may represent the location of the vehicle in the subsequent frame 514. However, some changes and/or difficulties in identifying the target object (e.g., the vehicle) may be too great for the trained matching function 502 to identify a best candidate region in a subsequent frame. For example, the feature representations of the candidate regions may not capture the appearance of the target in such a way that can be matched to the feature representation of the target in the first frame.

Figure 6:
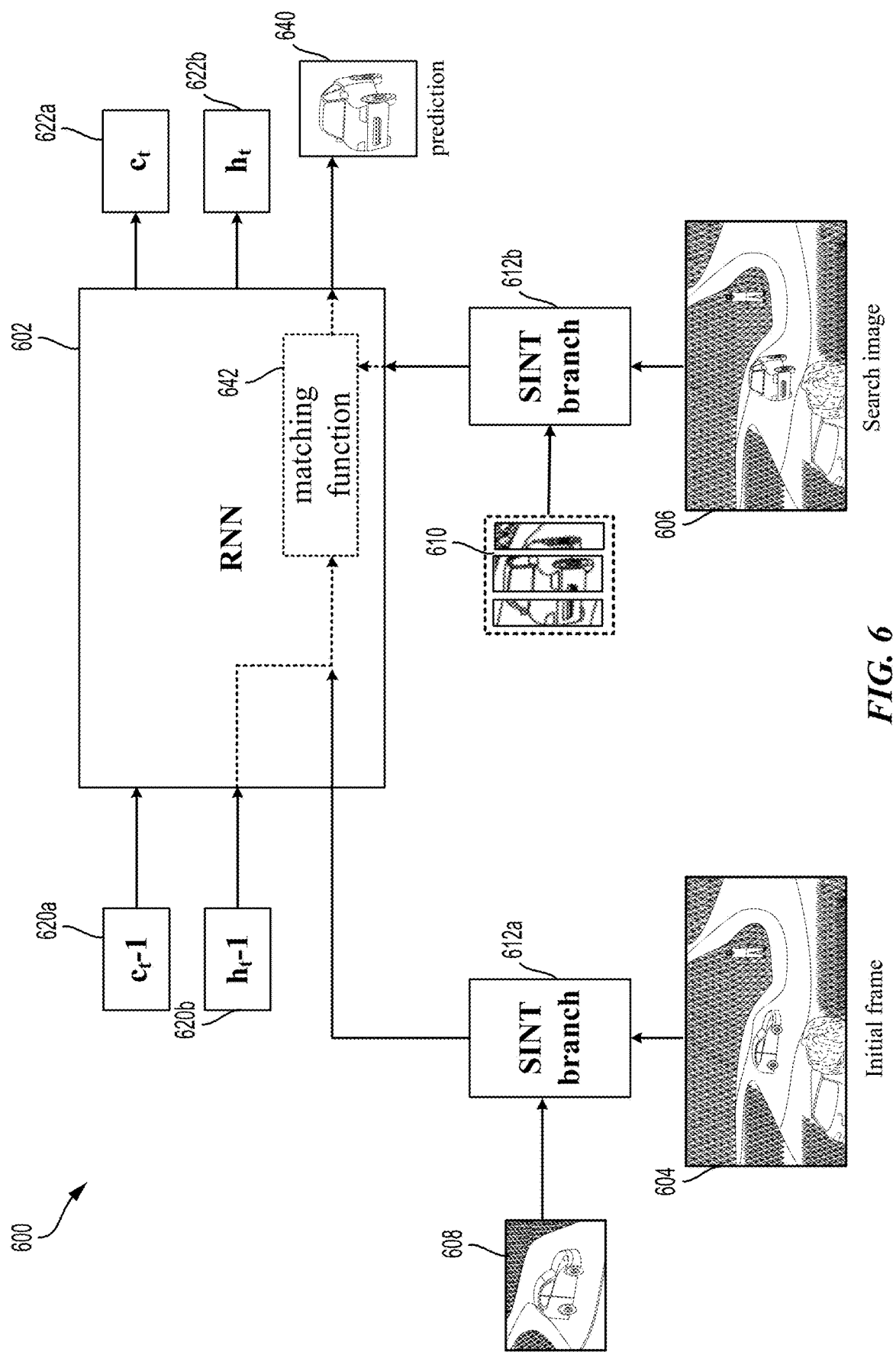
FIG. 6 is a diagram of a Recurrent Siamese INstance Tracker in accordance with aspects of the present disclosure.

FIG. 6 illustrates a diagram 600 of an example of a SINT that includes a recurrent neural network (RNN). In various aspects, an RNN 602 may be used with the SINT matching function. For example, the RNN 602 may update the feature representation of the target. This updated feature representation of the target may be provided to the SINT matching function in order to identify the best candidate feature representation for object tracking. Therefore, the SINT matching function may be provided a feature representation of the target object without online updating of the SINT matching function. Correspondingly, retraining and fine-tuning of the SINT may be avoided.

The SINT may include two branches 612*a*, 612*b*. Each branch 612*a*, 612*b* may operate as a feature extractor for the feature representation of the target object within the location 608 and the feature representation of the candidate regions 610. In various aspects, the RNN 602 may operate on top of the SINT in order to update the feature representation of the target object. Therefore, the RNN 602 may provide the updated feature representation of the target object to the SINT matching function. The SINT matching function may output a prediction 640 based on matching the updated feature representation of the target object to each of the candidate regions 610.

In some aspects, the appearance of a target object location 608 may be substantially changed between a first frame 604 and a subsequent frame 606. Such substantial changes may prevent the SINT matching function from identifying a best candidate region of the candidate regions 610 in which the target object is estimated to be located in the subsequent frame 606. However, substantial changes and/or difficulties in identifying the target object in the location 608 are unlikely to occur between two frames, but may progressively occur over a subset of frames. By keeping tracking of the minimal changes that, in the aggregate, constitute a substantial change, the effect (e.g., distortion of the target object in the location 608) of the substantial change and/or difficulties in identifying the target object in the location 608 may be addressed.

Accordingly, the RNN 602 may update the feature representation of the target object based on previous predications. The RNN 602 may then output an updated feature representation that is associated with the target object location 608. With the updated feature representation, the SINT matching function may be more likely to identify the best candidate region of the candidate regions 610 for tracking of the target object.

In some aspects, the RNN 602 may comprise a Long-Short Term Memory (LSTM) network. In order to keep track of changes to the target object, the RNN 602 may include a plurality of units. In one aspect, the RNN 602 may include one or more hundreds of hidden units (e.g., 400 hidden units). Further, a bias of "1" may be added to the forget gate of each hidden unit. The units of the RNN 602 which may be cell states 620*a*, 622*a* and hidden states 620*b*, 622*b* at various time steps. The cell states 620*a*, 622*a* and hidden states 620*b*, 622*b* may store the changes to the target object, including complex transformations to the target object. For example, the hidden state 620*b* may store observed information associated with the target object, which may capture changes to the representation of the object over a set of previous time steps (e.g., the previous time step t−1).

In one example, the first SINT branch 612*a* may obtain the first frame 604. The first frame 604 may include the location 608 of the target object. The second SINT branch 612*b* may obtain a subsequent frame 606. The second SINT branch 612*b* may identify a set of candidate regions 610 in which the target object is estimated to be at least partially located in the subsequent frame 606.

The first SINT branch 612*a* may provide the location 608 of the target object in the first frame 604 to the RNN 602. Additionally, the second SINT branch 612*b* may provide the candidate regions 610 estimated for the subsequent frame 606 to the RNN 602. Illustratively, the subsequent frame 606 may be at time step t. In order to estimate change(s) to the target object, the RNN 602 may be provided the cell/hidden states 620*a*, 620*b*, which may be generated by the RNN 602 at a previous time step t−1 (e.g., the time step immediately before time step t).

In order to account for the state of the target object in the previous time step t−1, the RNN 602 may add at least one hidden state 620b to the feature representation of the target object at the location 608. The at least one hidden state 620b may store information associated with the target object over a set of previous time steps (e.g., time step t−1). Therefore, the at least one hidden state 620b may represent observed information associated with the target object. The matching function 642 may then perform matching between the updated feature representation of the target object, shown in the location 608, to feature representations of each of the candidate regions 610. For example, the matching function 642 may include the dot product of the feature representation of the target object shown in the location 608 and updated with the addition of at least one hidden state 620b. The matching function 642 may then give a prediction 640.

For additional subsequent frames that follow the subsequent frame 606, change(s) to the target object may be continually stored. For example, the target object may experience a change between time step t and time step t+1. Therefore, the RNN 602 may compute the next cell state 622a and hidden state 622b. The RNN 602 may use the next hidden state 622b in order to update the feature representation of the target object at the location 608 for the SINT matching function at time step t+1.

Figure 7:
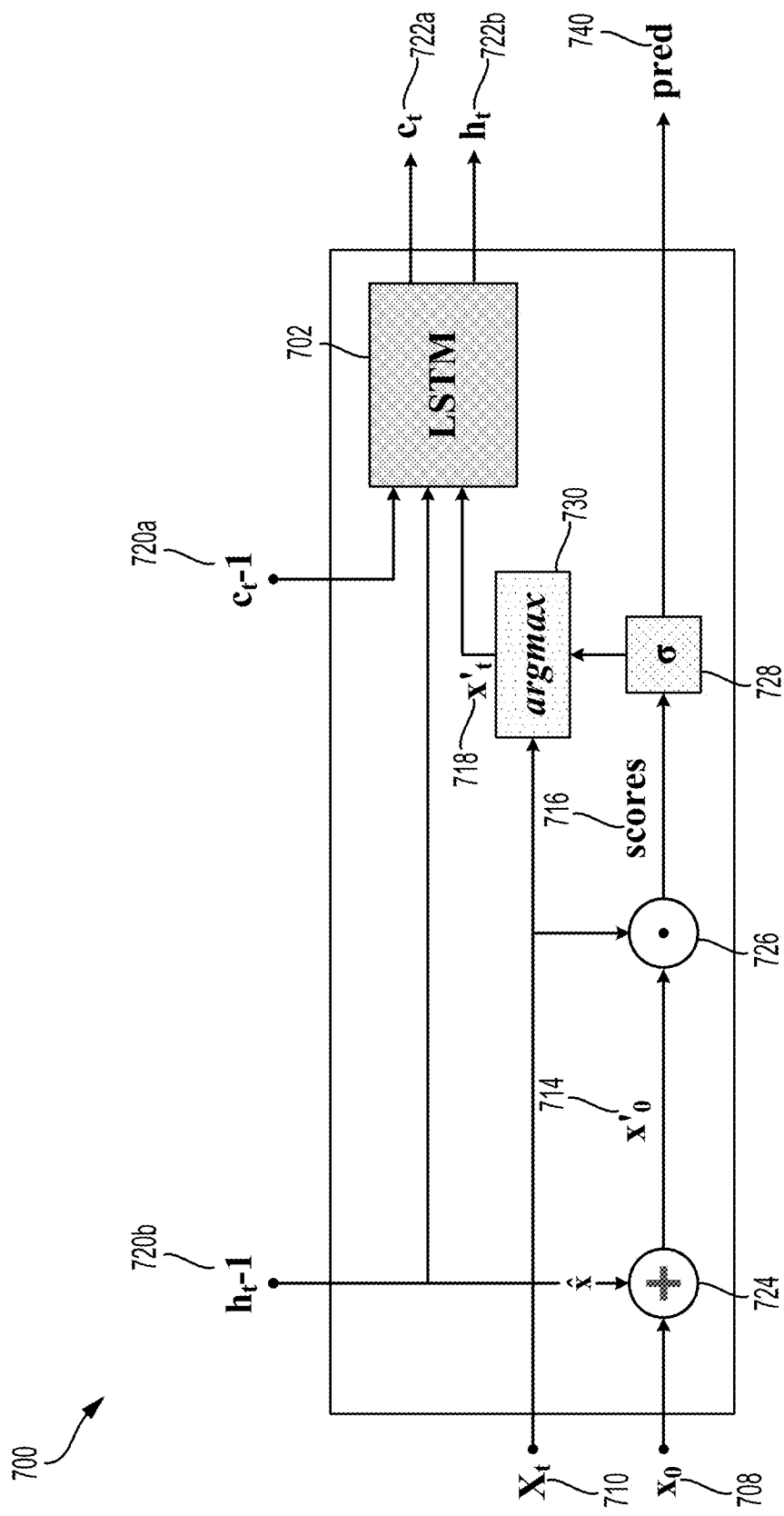
FIG. 7 is a diagram of a Recurrent Siamese INstance Tracker in accordance with aspects of the present disclosure.

FIG. 7 is a diagram of an example architecture 700 of a recurrent SINT. The recurrent SINT may be a SINT with an RNN on top of the two SINT branches. In the illustrated example, the recurrent SINT may model the target location at the time step t output a predication at time step t. With reference to FIG. 6, the example architecture 700 of the recurrent SINT may be an example of the RNN 602. For example, the first SINT branch 612a may provide a feature representation $x_0$ 708 of the target object, and the second SINT branch 612b may provide a set of candidate regions $X_t$ 710. In addition, the SINT matching function 642 of FIG. 6 may comprise at least the SINT matching function 726.

The recurrent SINT of FIG. 7 may implement an LSTM 702 as the RNN. The LSTM 702 may include one or more hundreds of hidden units (e.g., 400 hidden units). Each hidden unit may include an input gate, an output gate, and a forget gate. A forget gate of a hidden unit (e.g., the LSTM 702) may control how long information from one or more previous time steps is retained, and a bias may be added to the forget gate to influence how long that information is retained—e.g., the addition of a bias of "1" to a forget gate may improve performance of the LSTM 702.

At time step t, the model of the recurrent SINT may obtain the feature representation $x_0$ 708 of the target object. The feature representation $x_0$ 708 of the target object may be obtained from a first SINT branch (e.g., the first SINT branch 612a of FIG. 6).

At each time step, the feature representation $x_0$ 708 of the target object may be updated before application of the SINT matching function 726. However, changes to the feature representation $x_0$ 708 of the target object may not be propagated to future time steps. Instead, the feature representation $x_0$ 708 of the target object may be independently updated at each time step.

From a second SINT branch, the recurrent SINT may obtain a set of candidate regions $X_t$ 710. The set of candidate regions $X_t$ 710 may include a set of feature representations of locations of a frame at a current time step in which the target object is estimated to be located.

Additionally at time step t, the model of the recurrent SINT may obtain the previous cell state $c_{t-1}$ 720a and previous hidden state $h_{t-1}$ 720b. The previous states $c_{t-1}$ 720a and $h_{t-1}$ 720b may be based on a cell/hidden state at a previous time step t−1 and a best matching candidate region at the previous time step t−1, respectively. Thus, the previous cell state $c_{t-1}$ 720a and previous hidden state $h_{t-1}$ 720b may represent information observed in association with the target object over a set of previous time steps, including the previous time step t−1.

In order to update the feature representation $x_0$ 708 of the target object, an addition 724 of the previous hidden state $h_{t-1}$ 720b to the feature representation $x_0$ 708 of the target object may be performed. The previous hidden state $h_{t-1}$ 720b may be linearly transformed, and $l^2$ normalized (represented as X). The $l^2$ normalization of the previous hidden state $h_{t-1}$ 720b may be the Euclidean norm for the previous hidden state $h_{t-1}$ 720b. The $l^2$ normalization of the previous hidden state $h_{t-1}$ 720b may prevent the previous hidden state $h_{t-1}$ 720b from overtaking the feature representation $x_0$ 708 of the target object, which may also be $l^2$ normalized. The computation of $\hat{x}$ may be given by Equation 1.

$$\hat{x} = \frac{W_d \cdot h_{t-1}}{\|W_d \cdot h_{t-1}\|_2}$$

(Equation 1, where $W_d$ may be a weight matrix)

Accordingly, an updated feature representation $x'_0$ 714 of the target object may be generated. The updated feature representation $x'_0$ 714 of the target object may reflect changes to the target object at a set of previous time steps, captured with at least the hidden state $h_{t-1}$ 720b of the previous time step t−1. The updated feature representation $x'_0$ 714 of the target object may be given by Equation 2.

$$x_0' = \hat{x} + x_0 \qquad \text{(Equation 2)}$$

With the updated feature representation $x'_0$ 714 of the target object, the matching function 726 may be more likely to correctly identify the best candidate region in which the target object is estimated to be located in the current frame at time step t. Thus, the matching function 726 may be applied to determine correspondence between the updated feature representation $x'_0$ 714 of the target object and each candidate region of the set of candidate regions $X_t$ 710. The matching function 726 may be the dot products of the updated feature representation $x'_0$ 714 of the target object and each candidate region of the set of candidate regions $X_t$ 710.

The matching function 726 may compute scores 716, which may be representative of how closely the set of candidate regions $X_t$ 710 matches the updated feature representation $x'_0$ 714 of the target object. The set of scores 716 may be given by s in Equation 3.

$$s = X_t \cdot x_0' \qquad \text{(Equation 3)}$$

The scores 716 may be provided to a sigmoid layer 728. In one aspect, the sigmoid layer 728 may be pre-trained. The sigmoid layer 728 may determine a set of predictions based on the set of scores 716; the set of predictions may each correspond to a candidate region of the set of candidate regions $X_t$ 710, and the prediction 740 may be a prediction of the set of predictions corresponding to the best candidate region of the set of candidate regions $X_t$ 710. The sigmoid layer 728 may output the prediction 740, which include the best candidate region of the set of candidate regions $X_t$ 710. In other words, the prediction 740 may include a region (e.g., bounding box) in which the target object is estimated to be located in a frame at time step t. A prediction 740 may be given by pred in Equation 4.

$$\text{pred} = \sigma(ws \cdot s + bs)$$

(Equation 4, where ws and bs may be scalars)

So that a new updated feature representation of the target object can be generated for the next time step t+1, the next cell state $c_t$ 722a and the next hidden state $h_t$ 722b may be computed. The set of candidate regions $X_t$ 710 may include regions that to not include the target object, or at least do not include a sufficient representation of the target object that is useful for storing changes to the object. Therefore, the set of predictions (including the prediction 740) may be provided for an argmax operation 730.

The argmax operation 730 may receive, as inputs, the set of candidate regions $X_t$ 710 and the set of predictions computed by the sigmoid layer 728 for each of the set of candidate regions $X_t$ 710. The argmax operation 730 may return a resulting candidate region $x'_t$ 718 of the set of candidate regions $X_t$ 710. In some aspects, the resulting candidate region $x'_t$ 718 may be the best matching candidate region (although in some scenarios, a best matching candidate region for the original feature representation $x_0$ 708 may be unidentifiable). The resulting candidate region $x'_t$ 718 may be given by Equation 5.

$$x_t' = \arg\max(X_t, \text{pred}) \quad \text{(Equation 5)}$$

An LSTM 702 may receive, as inputs, the previous cell state $c_{t-1}$ 720a and the previous hidden state $h_{t-1}$ 720b and, additionally, the resulting candidate region $x'_t$ 718. The LSTM 702 may compute the next cell state $c_t$ 722a and the next hidden state $h_t$ 722b, which may be used to generate the updated feature representation of the target object at the subsequent time step t+1. The next cell state $c_t$ 722a and the next hidden state $h_t$ 722b may be given by Equation 6.

$$h_t, c_t = lstm(x_t', h_{t-1}, c_{t-1}) \quad \text{(Equation 6)}$$

In some aspects, the recurrent SINT may "drift" or begin tracking a different object instead of the target object. This issue may be commonplace among visual tracking systems with online adapting. The recurrent SINT may address this issue by clearing or restarting the memory cells of the LSTM 702 when the quality of the prediction 740 begins to degrade (e.g., falls below a threshold). By clearing the memory cells of the LSTM 702, the recurrent SINT may restore the original feature representation $x_0$ 708, which may enable the recurrent SINT to model the correct target object in subsequent frames.

Figure 8:
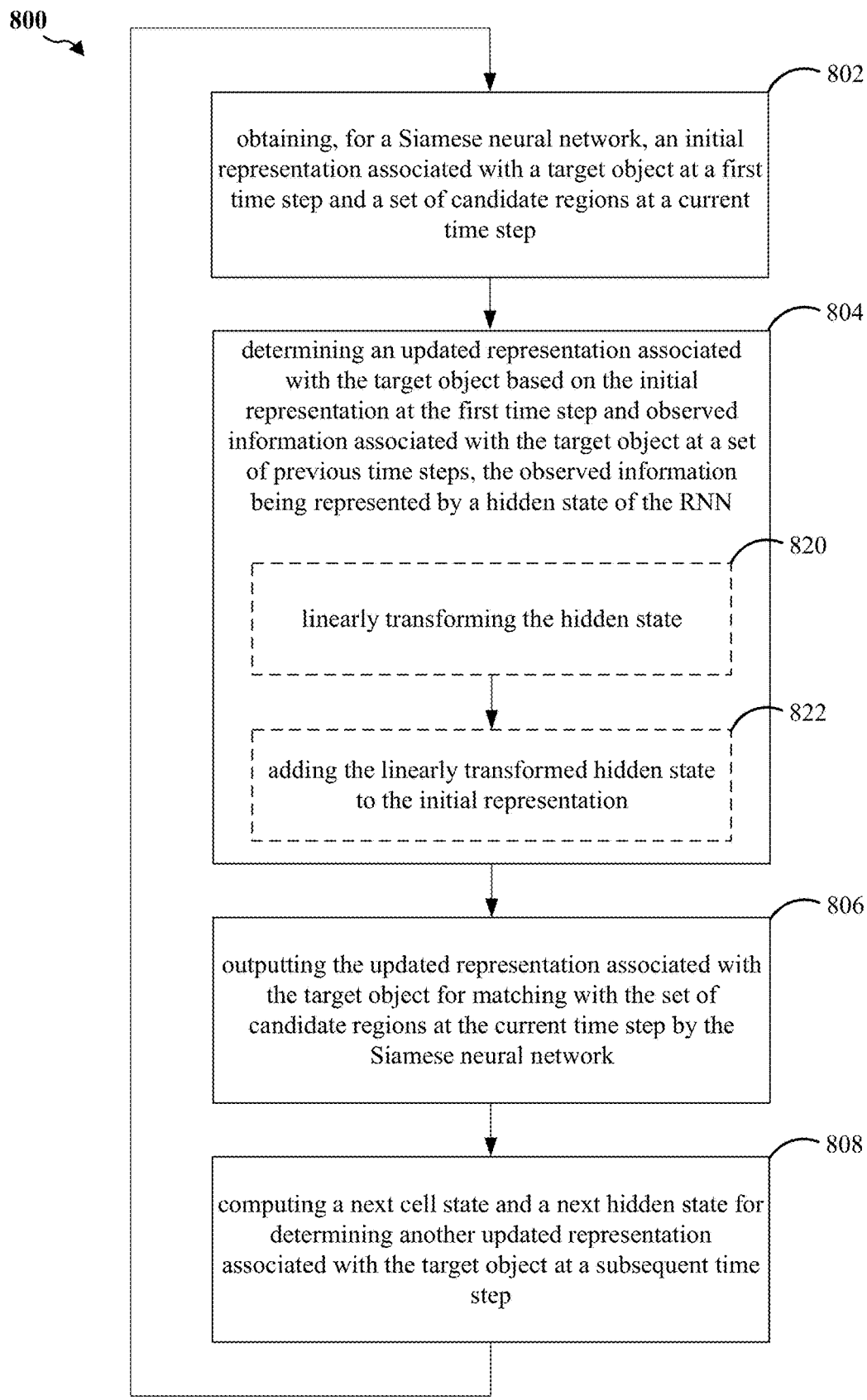
FIG. 8 is a flow diagram of a method tracking an object using a Recurrent Siamese INstance Tracker.

FIG. 8 illustrates a method 800 for tracking an object using an RNN on top of a SINT. The method 800 may be practiced by a recurrent SINT as described herein, which may be implemented on the SOC 100, the system 200, the network 300, or the deep convolutional network 350. In this example, the recurrent SINT may update a feature representation associated with a target object for the SINT matching function at time step t.

At operation 802, the recurrent SINT may obtain, for the SINT, an initial representation $x_0$ associated with a target object at a first time step 0 and a set of candidate regions $X_t$ at a current time step t. In aspects, the initial representation $x_0$ associated with the target object may be a feature representation of a location in a first frame of video in which the target object is located. The set of candidate regions $X_t$ at the current time step may be a set of regions that are locations in a current frame in which at least a portion of the target object is estimated to be located. Referring to FIG. 7, the recurrent SINT may obtain the feature representation $x_0$ 708 of the target object, and the recurrent SINT may obtain the set of candidate regions $X_t$ 710.

At operation 804, the recurrent SINT may determine an updated representation $x'_0$ associated with the target object based on the initial representation $x_0$ at the first time step and observed information associated with the target object at a set of previous time steps. The observed information associated with the target object at the set of previous time steps may be represented by a hidden state of the RNN, denoted $h_{t-1}$. The recurrent SINT may determine the updated representation $x'_0$ associated with the target object further based on a hidden state at the previous time step t−1, denoted $h_{t-1}$.

Referring to FIG. 7, the recurrent SINT may determine the updated feature representation $x'_0$ 714 of the target object based on the previous cell state $c_{t-1}$ 720a and previous hidden state $h_{t-1}$ 720b, which may represent information observed in association with the target object over a set of previous time steps, including the previous time step t−1. The computation of the updated feature representation $x'_0$ 714 of the target object may be given by Equation 2, supra.

In some aspects, operation 804 may include operation 820 and operation 822. At operation 820, the recurrent SINT may linearly transform the hidden state $h_{t-1}$, which may be a matrix. In some aspects, the recurrent SINT may normalize the dot product of a weight matrix $W_d$ and the hidden state. The normalization may be $l^2$ normalization, which may prevent the hidden state at the previous time step $h_{t-1}$ from taking over the initial representation $x_0$ associated with the target object at the first time step. The dot product of a weight matrix $W_d$ and the hidden state $h_{t-1}$, linearly transformed and $l^2$ normalized, may be denoted $\hat{x}$ and may be given by Equation 1, supra. Referring to FIG. 7, the recurrent SINT may compute $\hat{x}$ as the linear transformation of the previous hidden state $h_{t-1}$ 720b, and the $l^2$ normalization of the dot product of the previous hidden state $h_{t-1}$ 720b with a weight matrix $W_d$.

At operation 822, the recurrent SINT may add the linearly transformed (and $l^2$ normalized) hidden state, $\hat{x}$, with the initial representation associated with the target object at the first time step 0, denoted as $x_0$. The sum of $\hat{x}$ and $x_0$ may be an updated representation $x'_0$ that is associated with the target object. For example, the updated representation $x'_0$ may be a feature representation that captures change(s) to the representation of the target object over a set of previous time steps. The computation of the updated representation $x'_0$ that is associated with the target object may be given by Equation 2, supra. Referring to FIG. 7, the recurrent SINT may compute the sum of an addition 724 of the previous hidden state $h_{t-1}$ 720b and the initial representation $x_0$ 708 of the target object at the first time step 0.

At operation 806, the recurrent SINT may output the updated representation $x'_0$ for matching with the set of candidate regions $X_t$ at the current time step t by the SINT. For example, the recurrent SINT may include a matching function that includes a dot product between the updated representation $x'_0$ and the set of candidate regions $X_t$ at the current time step t. The dot product of the matching function may be a set of scores s, given by Equation 3, supra. Referring to FIG. 7, the recurrent SINT may apply the matching function 726 (e.g., dot product) between the updated feature representation $x'_0$ 714 of the target object and each candidate region of the set of candidate regions $X_t$ 710.

In aspects, the recurrent SINT may provide the resulting scores of the matching function as input to a sigmoid layer. The sigmoid layer may be pre-trained (e.g., on one or more training data sets) so that units may be activated when representations match candidate regions. Therefore, the sigmoid layer may output a prediction that indicates whether a respective candidate region of the set of candidate regions $X_t$ matches the updated representation $x'_0$ associated with the target object. In some aspects, each unit of the sigmoid function may be biased, e.g., with a value of "1." The computation of a prediction, denoted pred, may be given by Equation 4, supra. Referring to FIG. 7, the recurrent SINT may provide the scores 716 to the sigmoid layer 728, which may determine a set of predictions (including prediction 740) based on the scores 716. The sigmoid layer 728 may output the prediction 740, which include the best candidate region of the set of candidate regions $X_t$ 710.

At operation 808, the recurrent SINT may compute a next cell state and a next hidden state. Similar to the operations described for the current time step t, the recurrent SINT may model the change(s) of the target object as an update representation for the next time step t+1 based on the next cell state $c_t$ and the next hidden state $h_t$. The recurrent SINT may compute the next cell state $c_t$ and next hidden state $h_t$ based on the previous cell state $c_{t-1}$ and previous hidden state $h_{t-1}$.

In aspects, the recurrent SINT may compute the next cell state $c_t$ and the next hidden state $h_t$ based on a best matching candidate (e.g., the best prediction) at the current time step t. The recurrent SINT may identify the best matching candidate(s) using an argmax operation on the set of predictions from the sigmoid layer with the set of candidate regions $X_t$. The resulting candidate region may include the best matching candidate region of the set of candidate regions $X_t$. The resulting candidate region may be denoted $x'_t$, and may be given by Equation 5, supra. Referring to FIG. 7, the recurrent SINT may provide, as inputs to the argmax operation 730, the set of candidate regions $X_t$ 710 and the set of predictions computed by the sigmoid layer 728 for each of the set of candidate regions $X_t$ 710. The argmax operation 730 may return a resulting candidate region $x'_t$ 718 of the set of candidate regions $X_t$ 710.

The recurrent SINT may include an LSTM that receives, as inputs, the resulting candidate region $x'_t$, as well as the previous cell state $c_{t-1}$ and previous hidden state $h_{t-1}$. From the inputs, the LSTM may generate the next cell state $c_t$ and the next hidden state $h_t$. The next cell state $c_t$ and next hidden state $h_t$ may be given by Equation 6, supra. Referring to FIG. 7, the LSTM 702 may receive, as inputs, the previous cell state $c_{t-1}$ 720a and the previous hidden state $h_{t-1}$ 720b and, additionally, the resulting candidate region $x'_t$ 718. The LSTM 702 may compute the next cell state $c_t$ 722a and the next hidden state $h_t$ 722b, which may be used to generate the updated feature representation of the target object at the subsequent time step t+1.

In various aspects, the method 800 may return to operation 802 after identifying a location of a current frame at time step t in which the target object is estimated to be located. The recurrent SINT may iteratively progress through the operations of the method 800 to identify locations in subsequent frames in which the target object is estimated to be located. In each iteration, the information observed at a previous time step may inform the model at the current time step. Thus, the recurrent SINT may model change(s) to the target object over a plurality of frames, which may prevent the target object from being lost during tracking.

In one configuration, a Siamese neural network may comprise a SINT with an RNN on top of two SINT branches. Such a Siamese neural network may be configured to obtain an initial representation associated with a target object at a first time step and a set of candidate regions at a current time step; to determine an updated representation associated with the target object based on the initial representation at the first time step and based on observed information associated with the target object at a set of previous time steps, the observed information being represented by a hidden state of the RNN; and to output the updated representation associated with the target object for matching with the set of candidate regions at the current time step by the SINT.

The Siamese neural network may include an obtaining means for obtaining an initial representation associated with a target object at a first time step and a set of candidate regions at a current time step. The Siamese neural network may include a determining means for determining an updated representation associated with the target object based on the initial representation at the first time step and based on observed information associated with the target object at a set of previous time steps, the observed information being represented by a hidden state of the RNN. The Siamese neural network may include an outputting means for outputting the updated representation associated with the target object for matching with the set of candidate regions at the current time step by the SINT. The Siamese neural network may include a computing means for computing a next cell state and a next hidden state for determining another updated representation associated with the target object at a subsequent time step.

In one aspect, the obtaining means, the determining means, the outputting means, and/or the computing means may be the general-purpose processor 102, program memory associated with the general-purpose processor 102, memory block 118, local processing units 202, and or the routing connection processing units 216 configured to perform the functions recited. In another configuration, the aforementioned means may be any component or any apparatus configured to perform the functions recited by the aforementioned means.

According to certain aspects of the present disclosure, each local processing unit 202 may be configured to determine parameters of the Siamese neural network based upon desired one or more functional features of the model, and develop the one or more functional features towards the desired functional features as the determined parameters are further adapted, tuned and updated.

In some aspects, the method 800 may be performed by the SOC 100 (FIG. 1) or the system 200 (FIG. 2). That is, each of the operations of the method 800 may, for example, but without limitation, be performed by the SOC 100 or the system 200 or one or more processors (e.g., CPU 102 and local processing unit 202) and/or other components included therein.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, components, and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software component executed by a processor, or in a combination of the two. A software component may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software component may include a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein include one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may include a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may include packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may include one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may include a number of software components. The software components include instructions that, when executed by the processor, cause the processing system to perform various functions. The software components may include a transmission component and a receiving component. Each software component may reside in a single storage device or be distributed across multiple storage devices. By way of example, a software component may be loaded into RAM from a hard drive when a triggering event occurs. During execution of the software component, the processor may load some of the instructions into cache to increase access speed. One or more cache lines may then be loaded into a general register file for execution by the processor. When referring to the functionality of a software component below, it will be understood that such functionality is implemented by the processor when executing instructions from that software component. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may include non-transitory computer-readable media (e.g., tangible media). In addition, for other aspects computer-readable media may include transitory computer-readable media (e.g., a signal). Combinations of the above should also be included within the scope of computer-readable media.

Thus, certain aspects may include a computer program product for performing the operations presented herein. For example, such a computer program product may include a computer-readable medium having instructions stored (and/or encoded) thereon, the instructions being executable by one or more processors to perform the operations described herein. For certain aspects, the computer program product may include packaging material.

Further, it should be appreciated that components and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of visual object tracking using a recurrent neural network (RNN), the method comprising:
   obtaining, for a Siamese neural network, an initial representation associated with a target object at a first time step and a set of candidate regions at a current time step;
   determining an updated representation associated with the target object based on the initial representation at the first time step and observed information associated with the target object at a set of previous time steps, the observed information being represented by a hidden state of the RNN; and
   outputting the updated representation associated with the target object for matching with the set of candidate regions at the current time step by the Siamese neural network.

2. The method of claim 1, wherein the determination of the updated representation is further based on a hidden state at a previous time step.

3. The method of claim 2, wherein the determination of the updated representation comprises:
   linearly transforming the hidden state; and
   adding the linearly transformed hidden state to the initial representation.

4. The method of claim 2, further comprising:
   computing a next cell state and a next hidden state for determining another updated representation associated with the target object at a subsequent time step.

5. The method of claim 4, wherein the computation of the next cell state and next hidden state is based on a candidate region at the current time step that is determined to best match the updated representation by the Siamese neural network and is based on a cell state at the previous time step and the hidden state at the previous time step.

6. The method of claim 1, wherein the RNN comprises a single-layer Long Short Term Memory (LSTM) network.

7. An apparatus for visual object tracking using a recurrent neural network (RNN), the apparatus comprising:
   means for obtaining, for a Siamese neural network, an initial representation associated with a target object at a first time step and a set of candidate regions at a current time step;
   means for determining an updated representation associated with the target object based on the initial representation at the first time step and observed information associated with the target object at a set of previous time steps, the observed information being represented by a hidden state of the RNN; and
   means for outputting the updated representation associated with the target object for matching with the set of candidate regions at the current time step by the Siamese neural network.

8. The apparatus of claim 7, wherein the means for determining the updated representation is configured for determining further based on a hidden state at a previous time step.

9. The apparatus of claim 8, wherein the means for determining the updated representation is configured for:
   linearly transforming the hidden state; and adding the linearly transformed hidden state to the initial representation.

10. The apparatus of claim 8, further comprising:
means for computing a next cell state and a next hidden state for determining another updated representation associated with the target object at a subsequent time step.

11. The apparatus of claim 10, wherein the means for computing the next cell state and next hidden state is configured for computing based on a candidate region at the current time step that is determined to best match the updated representation by the Siamese neural network and further based on a cell state at the previous time step and the hidden state at the previous time step.

12. The apparatus of claim 7, wherein the RNN comprises a single-layer Long Short Term Memory (LSTM) network.

13. An apparatus for visual object tracking using a recurrent neural network (RNN), the apparatus comprising:
a memory; and
at least one processor coupled to the memory and configured to:
   obtain, for a Siamese neural network, an initial representation associated with a target object at a first time step and a set of candidate regions at a current time step;
   determine an updated representation associated with the target object based on the initial representation at the first time step and observed information associated with the target object at a set of previous time steps, the observed information being represented by a hidden state of the RNN; and
   output the updated representation associated with the target object for matching with the set of candidate regions at the current time step by the Siamese neural network.

14. The apparatus of claim 13, wherein the determination of the updated representation is further based on a hidden state at a previous time step.

15. The apparatus of claim 14, wherein the determination of the updated representation comprises to:
linearly transform the hidden state; and
add the linearly transformed hidden state to the initial representation.

16. The apparatus of claim 14, wherein the at least one processor is further configured to:
compute a next cell state and a next hidden state for determination of another updated representation associated with the target object at a subsequent time step.

17. The apparatus of claim 16, wherein the computation of the next cell state and next hidden state is based on a candidate region at the current time step that is determined to best match the updated representation by the Siamese neural network and is based on a cell state at the previous time step and the hidden state at the previous time step.

18. The apparatus of claim 13, wherein the RNN comprises a single-layer Long Short Term Memory (LSTM) network.

19. A non-transitory computer-readable medium storing computer-executable code for visual object tracking using a recurrent neural network (RNN), comprising code to:
obtain, for a Siamese neural network, an initial representation associated with a target object at a first time step and a set of candidate regions at a current time step;
determine an updated representation associated with the target object based on the initial representation at the first time step and observed information associated with the target object at a set of previous time steps, the observed information being represented by a hidden state of the RNN; and
output the updated representation associated with the target object for matching with the set of candidate regions at the current time step by the Siamese neural network.

20. The non-transitory computer-readable medium of claim 19, wherein the determination of the updated representation is further based on a hidden state at a previous time step.

21. The non-transitory computer-readable medium of claim 20, wherein the determination of the updated representation comprises to:
linearly transform the hidden state; and
add the linearly transformed hidden state to the initial representation.

22. The non-transitory computer-readable medium of claim 20, further comprising code to:
compute a next cell state and a next hidden state for determination of another updated representation associated with the target object at a subsequent time step.

23. The non-transitory computer-readable medium of claim 22, wherein the computation of the next cell state and next hidden state is based on a candidate region at the current time step that is determined to best match the updated representation by the Siamese neural network and is based on a cell state at the previous time step and the hidden state at the previous time step.

24. The non-transitory computer-readable medium of claim 19, wherein the RNN comprises a single-layer Long Short Term Memory (LSTM) network.

* * * * *